April 11, 1950     J. STOIBER     2,503,777
FRONT SHUTTER REFLEX CAMERA

Filed May 21, 1947     3 Sheets-Sheet 1

JOSEPH STOIBER.
INVENTOR

BY
ATTORNEYS

April 11, 1950             J. STOIBER             2,503,777

FRONT SHUTTER REFLEX CAMERA

Filed May 21, 1947             3 Sheets-Sheet 2

JOSEPH STOIBER
*INVENTOR*

BY
*ATTORNEYS*

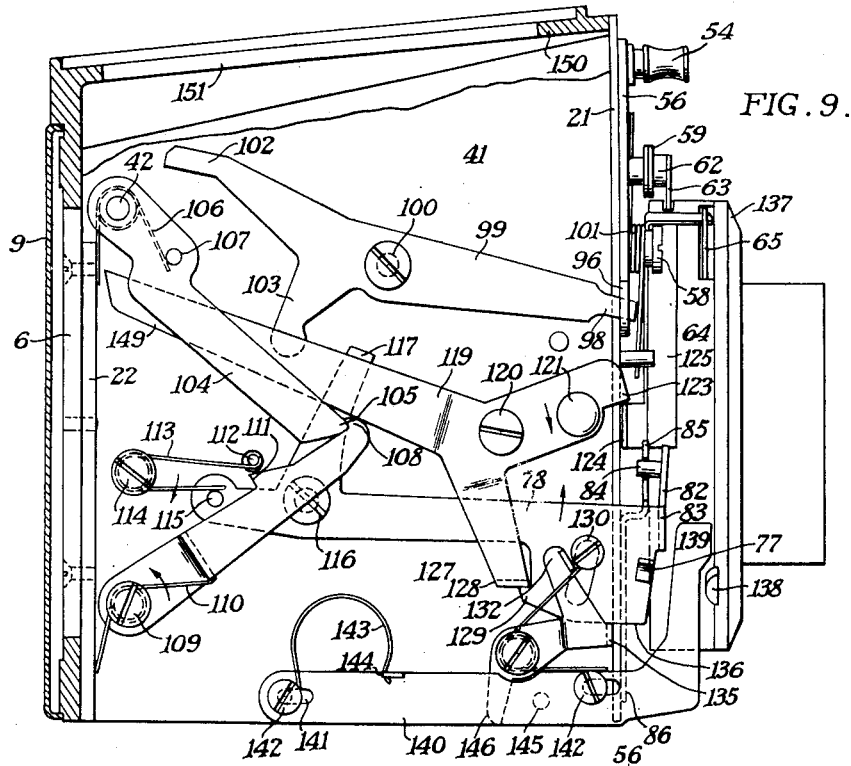

Patented Apr. 11, 1950

2,503,777

UNITED STATES PATENT OFFICE 2,503,777

FRONT SHUTTER REFLEX CAMERA

Joseph Stoiber, Rochester, N. Y., assignor to Eastman Kodak Company, Rochester, N. Y., a corporation of New Jersey Application May 21, 1947, Serial No. 749,532

18 Claims. (Cl. 95—42)

This invention relates to photography and more particularly to reflex cameras of the type employing a between-the-lens shutter. One object of my invention is to provide a reflex camera in which the camera body is constructed of a number of interfitting parts which can be readily assembled and which provide ample space for mounting operating mechanisms. Another object of my invention is to provide a camera in which simple control elements operate a number of mechanisms in their proper sequential relationships. A further object of my invention is to provide a front shutter reflex camera in which the mechanisms are automatically latched unless operated in the proper sequence, and other objects will appear from the following specification, the novel features being pointed out in the claims at the end thereof.

This application is a continuation-in-part of my application Ser. No. 659,627 for Front shutter reflex camera, filed April 4, 1946 and now abandoned.

Front shutter reflex cameras have a number of advantages over the more usual type of focal plane reflex cameras, among which are that a high-speed, between-the-lens shutter prevents the picture from being distorted, this distortion occurring in focal plane shutters as the slit in the curtain shutter passes across the exposure aperture to make an exposure. However, front shutter reflexes are considerably more complicated than the usual focal plane shutter type, because of the mechanism necessary to open the shutter blades for focusing, to close the shutter blades before the mirror is raised, and to operate the various between-the-lens type of shutter controls. One of the objects of my invention is to so construct a camera as to provide a convenient location for the various shutter and mirror controls, and so as to provide a camera which can be readily assembled, and, if necessary, disassembled for repairs. It is also an object of my invention to provide mechanism by which the various functions necessary for focusing and exposing may be accomplished, this mechanism being provided with simple operating members.

Coming now to the drawings wherein like reference characters denote like parts throughout:

Fig. 9 is a fragmentary view showing the inner camera body member in elevation with a portion of the outer camera body shown in section. In this view the mechanism is shown in a shutter set position; and Fig. 10 is a view similar to Fig. 9 but with the parts shown in a shutter released position.

My invention consists broadly in a front shutter reflex provided with operating mechanisms so arranged that by moving one lever, the camera is conditioned for exposure in that the mirror is lowered to an operative position, the shutter blades are opened for focusing, the diaphragm is opened to its full extent for focusing, and the shutter is set. This setting lever for conditioning the camera for an exposure can only be operated if a film-winding knob has first been turned to wind a fresh film area into place. While it is not necessary to turn the film-winding knob to completely position a fresh area of film, as would be necessary to make the camera absolutely foolproof, it is, nevertheless, thought that where the film winding is started, it will not be discontinued until a film is completely wound. After the camera has been conditioned for exposure, pressure upon a second lever causes the following operations to take place. The shutter blades are closed; the diaphragm closes down to a pre-selected stop, or, if the objective is to be used wide open, remains wide open. The mirror moves upwardly into an inoperative position, and the shutter trigger is pressed to make an exposure. The mechanism is so arranged that all these movements take place in their required sequence, after which the mechanism cannot be again operated until film is wound and the shutter is set. The various mechanisms for accomplishing these movements are arranged in light-tight chambers formed by specially constructed inner and outer camera body members; these parts being so arranged that the inner body member carrying the mechanism on the outside of certain walls can be readily removed from the main camera body, and so that in setting up the camera, these parts can be readily assembled.

Figure 1:
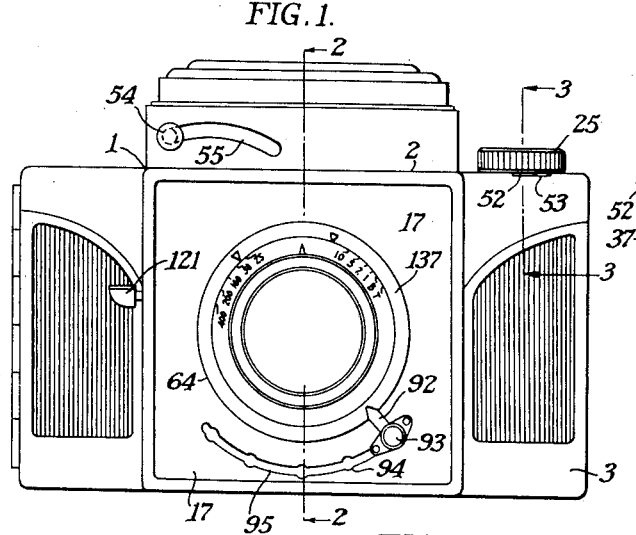
Fig. 1 is a front elevation of a camera constructed in accordance with a preferred embodiment of my invention.
Figure 7:
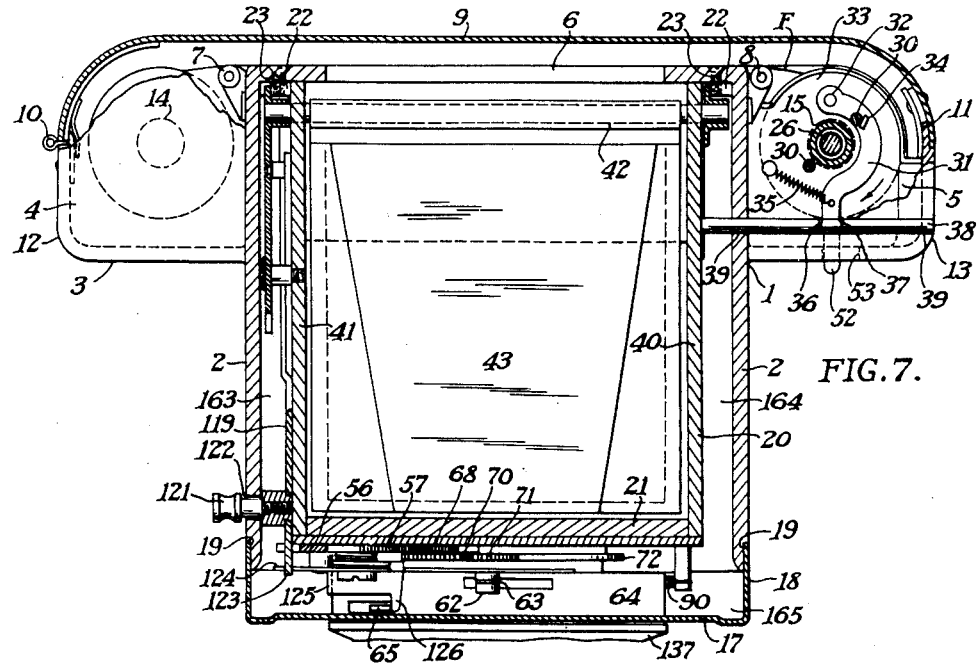
Fig. 7 is a transverse section, parts being shown in elevation through the embodiment of my invention shown in Fig. 1.

More specifically, a preferred embodiment of my invention is shown in the accompanying drawings. As indicated in Figs. 1 and 7, the camera body 1 consists of a rectangular body portion 2 extending forwardly from an elongated rear body section 3 which contains a supply spool chamber 4 and a take-up spool chamber 5. These spool chambers are spaced on each side of an exposure frame 6 over which a film "F" may be drawn for exposure past guide rolls 7 and 8. A camera back 9 is preferably hinged at 10 and has a light-tight connection at 11 with the camera body end walls 12 and 13 to give access to the film chambers 4 and 5 for inserting and removing spool film. A supply spool 14 may be placed in chamber 4 and a take-up spool 15 may be placed in spool chamber 5, and the film may be positioned for exposure.

The front wall 17 of the camera body preferably consists of a metal plate which may be attached in any suitable manner, this plate having rearwardly-extending flanges 18 engaging in a rabbet 19 in the box-like extension 2.

The inner camera body member 20 is a generally box-like structure having a front wall 21 and having an open rear wall, there being flanges 22 for locating the inner camera body against the exposure frame 6. Screws 23 may be used to hold the inner body member 20 in its assembled position and, as will be evident from this construction, by merely removing the front wall 17 and the screws 23, the inner body member may be slid out from the main body member or may be assembled thereto very quickly and easily.

Figure 3:
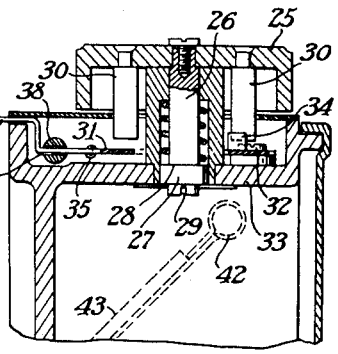
Fig. 3 is an enlarged section showing a portion of the film-winding mechanism and taken on line 3—3 of Fig. 1.

The film-winding mechanism is in part much like a standard film-wind mechanism in that there is a winding key, or knob, 25, as best shown in Fig. 3, which is mounted on a post 26 having a film spool-engaging key 27. This post is provided with a shoulder 28 which bears against a spring 29 so that when the winding knob 25 is moved outwardly, the winding key 27 may be withdrawn from the take-up film spool 15, which is mounted in the spool chamber 5. This construction is well known. However, the winding key is provided with a mirror latch-operating mechanism which is preferably constructed as follows: The winding knob 25 is provided with one or more downwardly-extending posts 30, these posts, of course, passing through a circular path, as best shown in Fig. 7. A lever 31 is pivoted at 32 in the spool chamber on the wall 33 and this lever carries one or more upstanding lugs 34, so positioned that each time the winding knob 25 is turned (in this instance 180 degrees because of the two posts 30), a post will strike the upstanding lug 34 and move the lever 31 away from the axis of the film spool. A spring 35 tends to hold the lever 31 in its Fig. 7 position, so that after each engagement with a post 30, the lever returns to its Fig. 7 position. The lever 31 includes a circular portion 36 engaging in a slot 37 in a slidable bolt 38. This bolt 38 may slide in holes 39 in the camera body, and in its position of rest, rests against the wall 40 of the inner body member.

Figure 4:
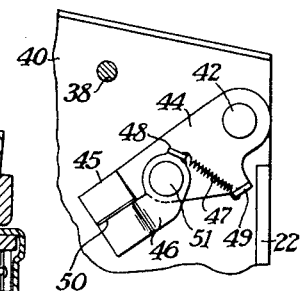
Figs. 4 and 5 are fragmentary elevations of a mirror latch element showing the position of this element in an inoperative position in Fig. 4 and in an operative position in Fig. 5.
Figure 5:
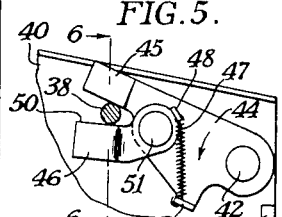
Figure 6:
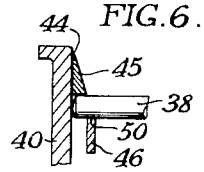
Fig. 6 is a fragmentary detailed section through the latch mechanism taken on line 6—6 of Fig. 5.

The function of this bolt is to form a latch which will hold the mirror in its inoperative position in which the mirror is raised beyond the axis of the objective and into a position in which the camera is ready for exposure. Referring to Figs. 4 and 5, there is a shaft 42 carried by the walls 40 and 41 of the inner body section so as to move with a mirror 43 as the mirror moves from its operative position in Fig. 2 to the inoperative position, above described. The shaft 42 carries an arm 44, this arm having a beveled or ramp-shaped end portion 45, as best shown in Fig. 6. When the bolt 38 lies beneath the arm 44, as indicated in Fig. 5, it is obvious that the arm 44, the shaft 42, and the mirror 43, cannot be turned in the direction shown by the arrow in Fig. 5, since the parts are latched by the bolt. This is the position the parts assume after an exposure has been made and before a fresh area of film has been wound into position. When the winding key 25 is turned a distance sufficient for a post 30 to engage the lug 34 and consequently swing the lever 31 against the pressure of its spring 35, the bolt 38 will be intermittently moved in an axial direction one or more times. When the bolt 38 is withdrawn from its latching position in Fig. 5, it will be held against return to its latching position by means of a blocking plate 46 which is pivotally mounted, in the present instance, upon the arm 44; there being a spring 47 connected to the lugs 48 and 49 tending to hold the blocking plate in its Fig. 4 position. It should be noticed that the edge 50 of the blocking plate (Fig. 6) is at a higher elevation with respect to the inner camera wall 40 than the ramp 45 so that after an exposure is made and the arm 44 moves upwardly with the mirror to an inoperative position, the end of the bolt 38 may ride up the incline 45, engage the edge 50 of the blocking plate 46 allowing the blocking plate to rock upon its pivot 51 so that the bolt 38 may drop down into its latching position shown in Fig. 5.

While the above mirror latch prevents operation of the camera until film is wound, in rare instances it may be desirable to purposely make double exposures on a portion of film and, therefore, the end 52 of the lever 31 is brought out through a slot 53 in the camera body wall 1 so that the mirror latch may be released manually by moving this lever, and with it the bolt 38.

The mirror latch and film-winding mechanism is carried by the camera body member 1 and by the inner camera body member 20, as above described. The remaining mechanism for the camera is carried primarily on two walls 41 and 21 of the inner camera body member. This generally box-shaped member is to be assembled with the various operating mechanisms before it is assembled in the camera body 1 so that the assembling operation can be conveniently and easily carried out. With the inner camera body member removed from the outer camera body member 2, the mechanism parts, which will now be described, can be readily assembled.

In order to set the camera and condition it for exposure, a single knob 54 must be moved. This knob 54 moves through a slot 55 and since one of the operations it performs is to lower the mirror to its operative position, it can only be moved when the mirror latch has been released by winding film.

Figure 8:
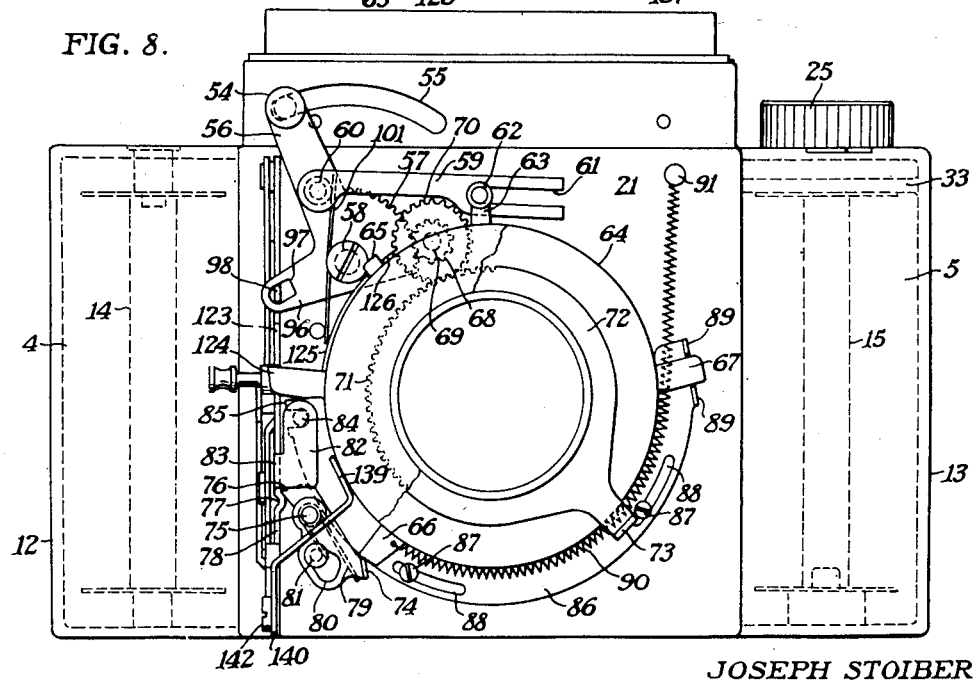
Fig. 8 is a front elevation of the camera shown in the preceding figures but with the front wall removed to expose a portion of the operating mechanism for the shutter.

Referring to Fig. 8, the setting knob 54 is attached to a lever 56 including a gear segment 57 and is pivoted at 58 to the front wall 21 of the inner body member. An arm 59 is pivotally attached at 60 to the arm 56 and carries a fork 61 engaging a knob 62 of a shutter-setting lever 63. The shutters 64, also mounted on the front wall 21 of the inner body member, may be of any preferred type which includes a setting lever 63, a shutter trigger 65, a diaphragm lever 66, and a blade opening lever 67. Such shutters are known and since the shutter per se forms no part of the present invention, it need not be further described.

When the knob 54 is moved through its slot, the setting lever 62 is moved to set the shutter mechanism. At the same time the diaphragm lever 66 is latched in its wide-open position by the following mechanism. The gear segment 57 meshes with a pinion 68, turning a shaft 69, and a gear 70 meshing with a gear segment 71 on a ring 72 having an offset arm 73. The arm 73 moves the diaphragm lever 66 until this lever is caught by a latch member 74 by which it is held in its wide-open position for focusing. This latch is pivoted at 75 and has a nose 76 which may be engaged by a protuberance 77 on lever 78 when this latch is to be swung against the pressure of spring 79 which tends to hold the latch in its latched position. The aperture 80 limits the movement of the latch member about the pin 81.

The lever 78 also includes a finger 82 extending generally parallel to the front wall 21, this finger being bent forwardly at 83 from the arm 78. A pin 84 carried by the finger engages a fork 85 of an arcuate arm 86 having pin 87 and slot 88 connections with the front wall 21 of the inner camera body portion. The arcuate lever 86 has a pair of spaced upstanding lugs 89 which engage the blade-opening lever 67. This shutter 64 is of the type that when the lever 67 is raised, the shutter blades are independently opened irrespective of the shutter setting and when the lever 67 is lowered, the blades are closed.

A coiled spring 90 connects the diaphragm arm 66 with a stud 91, tending to close the diaphragm when the latch 74 is released. The degree of closing movement is controlled by an adjustable stop which may be of a known type, and which is illustrated in Fig. 1. This stop 92 can be adjusted to the required diaphragm opening and is provided with a handle 93 which includes a ball which may snap into any aperture 94 in the arcuate slot 95. The apertures 94 are arranged in accordance with various diaphragm openings. The function of this diaphragm setting is that the handle 93 may position a pin in the path of the diaphragm lever 66, so that when the latch 74 is released, the spring 90 will cause the arm 66 to swing rapidly until it strikes the preset stop pin carried by the handle 93. Since this construction—a diaphragm spring pressed towards an adjustable stop pin—is known, the details need not further be described.

The setting lever 56 is also provided with an arm 96 having an opening 97 engaging a lug 98 on a setting lever 99 pivoted on a stud 100 to the inner body wall 41. This lever is moved with the setting lever 56 and since a relatively heavy spring 101 normally holds the knob 54 in the position shown in Figs. 1 and 8, this same spring holds lever 99 in a normal position of rest, as shown in Figs. 9 and 10.

The setting lever 99 has two arms 102 and 103. Arm 102 is utilized to set the mirror. The shaft 42 of the mirror extends through the wall 41 and is provided with a mirror arm 104; this arm, or the extreme end thereof 105, forming a mirror latch element. A spring 106 pressing against a pin 107 tends to raise the mirror and the arm 104 into the position shown in Fig. 10. This is the position which the mirror assumes while an exposure is being made. When the button 54 is moved to set the camera and condition it for an exposure, the arm 102 engages the pin 107, swinging the arm 104 in the direction shown by the arrow in Fig. 10 and moving it downwardly until the latch element 105 is engaged by a latch element 108, as shown in Fig. 9. Latch element 108 is pivoted at 109 and is normally swung in the direction shown by the arrow in Fig. 9 by means of a spring 110. This holds latch 108 against latch 105 or pin 112 according to the position of the parts. In its extreme uppermost position portion 111 of this latch element may rest on a pin 112 which also carries one end of a spring 113 encircling a stud 114 and exerting a downward thrust on a pin 115 carried by the lever 78, this lever being pivoted on stud 116.

As the lever 99 sets the mirror arm and latch 104—105, arm 103 of the setting lever engages an upstanding arm 117 on the arm 78. Thus, this arm is moved in a clockwise direction about the stud 116.

The release lever is a lever 119 pivoted on a stud 120 carried on the inner camera body wall 41. This lever is provided with an operating finger piece 121 which extends through a slot 122 in the camera wall front extension 2 and into an operative position, as shown in Figs. 1, 7, and 8. Lever 119 has a forward extension 123 which bears on a radially-extending arm 124 of an arcuate plate 125 having a forwardly-extending arm 126 engaging the shutter trigger 65. The arcuate plate 125 may slide on a pin-and-slot connection, not shown, on the shutter casing 64 in a very similar manner to the arcuate plate 86. Thus, when the finger piece 121 is moved downwardly in the direction shown by the arrow in Fig. 9, part 123 moves arm 124 downwardly and actuates the shutter trigger 65. It should be noticed that the present shutter, like most of the well-known shutters on the market, has a trigger which passes through a considerable path of movement before the shutter is released. This feature is made use of, because before the shutter should be tripped, the blades must have been closed, the diaphragm must have returned to its predetermined stop, and the mirror must be moved from its operative or focusing positions. These various steps are carried out as follows: The release lever 119 has a downwardly-extending arm 127 with a latch element 128 having a comparatively short engagement with a latch element 129 on arm 78. As above explained, arm 78 tends to move in the direction shown by the arrows in Fig. 9 about the pin 130 which passes through a guiding slot 131. Thus, the first part of the clockwise movement of the lever 119 releases the latch 128 and 129 so that as this lever swings, under the influence of its spring 113, the protuberance 77 will immediately release the latch 74 so that the diaphragm lever 66 may quickly swing under the influence of the spring 90 to its predetermined stop. In addition, the counter-clockwise movement of lever 78 raises the pin 84 and moves the forked end 85 of the arcuate lever 86, thereby moving the blade-opening lever 67 to close the shutter blades. Also as lever 78 moves in a counter-clockwise direction about its stud 116, pin 115 is lowered upon and moves latch 108 releasing the mirror latch element 105 permitting spring 106 to move lever 104 as the mirror moves upwardly and into an inoperative position. Latch 108 may rest against pin 115 until lever 78 moves in a reverse direction in setting, at which time stop lug 111 will come to rest against stop pin 112, holding the latch element 108 in a position to snap over latch element 105 carried by the mirror arm 104 when this arm lowers with the mirror moving towards an operative position which, of course, occurs when the knob 54 is moved to place the camera in condition for exposure. As above described, this includes the step of lowering the mirror into its operative or focusing position.

When the release lever is fully depressed, the arm 127 is engaged by a lever 132 which is pivoted on a stud 133 and normally turned in a counter-clockwise direction by a spring 134. The lever 132 by exerting a thrust on arm 127 prevents this arm from moving upwardly after an exposure has been made and until the setting button 54 is moved to operate the setting lever 99. When this is done, the lever 132 is moved in the following manner. The lever 132 is provided with a downwardly-extending lug 135 lying against the lower edge 136 of lever 78, and when this lever is moved by the setting lever 99, through the engagement of arms 103 and 117, lever 132 is moved through the lug 135.

If it is desired to make a time exposure, it is necessary to allow the trigger-operating arm 123 to move up and then to move down again to close the shutter after opening it, as is well known. The illustrated shutter 64 is of the type in which setting is accomplished by moving a ring 137 around the periphery of the shutter. This ring carries a cam 138 which, when the shutter is set for time, and time alone, will engage the arm 139 of the time slide 140. This time slide includes slots 141 engaging screws 142 carried by the inner camera body wall 41, and a spring 143 exerts a light thrust on the slide through engagement with a lug 144 in the direction shown by the arrow in Fig. 10. Therefore, when the shutter is set for time and the lug 138 engages the arm 139, this slide, through a pin 145 engaging a downwardly-extending arm 146 on the slide 140 will hold the lever 132 in such a position that partial retraction of the release button 121 can be accomplished; this partial retraction being to such an extent that while the trigger does not return to its normal position of rest, it does return to a position from which it may be again actuated to close the shutter blades after they have been opened for a time exposure. When the knurled ring 137 is moved from the time setting, the slide 140 immediately moves to its normal position of rest in which it does not affect the holding movement of arm 132 for the operating lever 119.

It is, of course, important to prevent the shutter trigger from being operated until the mirror 43 is in its inoperative position in which position the mirror arm 104 is raised, as in Fig. 10. To accomplish this, the lever 119 has an upwardly-extending arm 149 which is adapted to engage the pin 107. With any normal operation of the release button 121, the spring 106 has sufficient power to raise the mirror and the latch arm before the shutter trigger 65 is operated. If the release button 21 is depressed with great speed—which is always undesirable because it tends to shake the camera—it might be possible for the lever 119 to turn more rapidly than the lever 104 under the impulse of its spring 106. If this unlikely event should occur, the lever 149 would engage the pin 107 on the mirror arm 104 and this would tend to accomplish two things. First, it would cause the mirror arm 104 to raise more rapidly and, second, it would tend to slow up the movement of the release lever 119. In any event, the position of the lever 149 relative to the pin 107 is such that the part 123 which operates the trigger 65 through the arcuate slide 125 with its lugs 124 and 126 is such that the mirror 104 is always in an inoperative position before the actual release of the trigger occurs.

Figure 2:
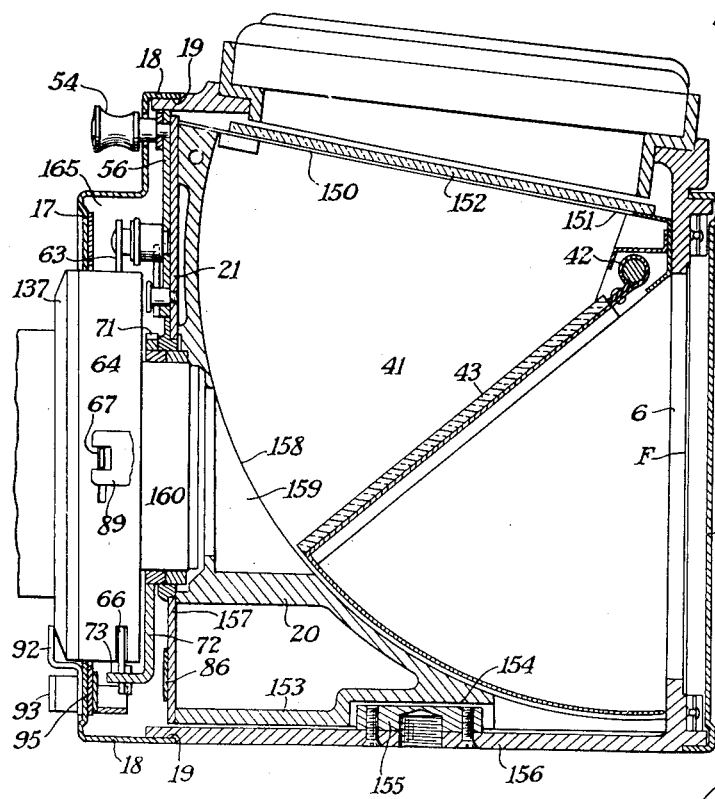
Fig. 2 is an enlarged section taken on line 2—2 of Fig. 1.

The arrangement of the camera body and the inner camera body is particularly designed to facilitate assembly. The inner camera body consists of a generally rectangular box-like structure having side walls 40 and 41, a slanting top wall 150 having a relativey large open space 151 carrying a ground glass 152 and a relatively short bottom wall 153. This bottom wall does not extend a full length of the side walls 40 and 41, as shown in Fig. 2, and is preferably provided with an offset 154 to receive the tripod socket plate 155 carried by the bottom outside camera wall 156. The inner camera body front wall 21 includes a plate 157 and an arcuate-shaped wall 158, there being an aperture 159 in which the rear lens tube 160 of the shutter 64 is mounted. There is no rear wall to the inner camera body section, but there are two outwardly-turned flanges 22, one on each wall 41 and 40, which are to locate the inner camera body in the main camera body, as indicated in Fig. 10, by means of apertures 161 engaging locating dowels 162 carried by the outer camera body rear wall 6 which forms the exposure frame and which is spaced from the camera back 6.

With the inner camera body constructed as above described, the spaced walls 41 and 2 and 40 and 2, as shown in Fig. 7, form chambers 163 and 164 in which mechanism can be mounted, and there is a similar mechanism chamber 165 between the front plate 17 and the part front wall 21 of the inner camera body.

These mechanism chambers in the two side walls and the front wall entirely enclose the setting and tripping mechanisms and in spite of the comparatively complicated nature and number of the parts required, the exterior of the camera and the manually-operable parts of the camera present a clean and simple appearance.

The operation of assembling the improved camera can be readily carried out by assembling the various parts on the inner camera body walls 41, 40 and 21 after which the inner camera body may be slid into position by locating on the dowel pins 162, so that by attaching the screws 23 the camera is assembled.

The operation of the camera is extremely simple. Assuming that an operator does not know the condition of the camera, he may first attempt to set the various mechanisms by moving the setting button 54 through its slot 53. If film has not been wound, he will be unable to move the setting button 54 because this movement lowers the mirror and the mirror will be immovable in its inoperative position because of the position of the bolt 38. Therefore, he will next turn the knob 25 to wind film. As film is wound, a post 30 will contact with the upstanding lug 34 on the lever 31, moving this lever in a counter-clockwise direction as the post 30 passes the lug 34. By moving the lever 31 against the pressure of its spring 35, the bolt 38 is withdrawn from its locking engagement with the latch element 45, and the blocking plate 46 will (as soon as the bolt 38 has been raised) snap beneath the bolt preventing it from returning to its locking position. If the operator should next try to release the lever 121 to make an exposure, this could not be done because the release lever is locked down until the setting lever 54 has been moved. He will therefore next set the shutter by moving the button 54 through the slot 55 and releasing it. This movement causes the following operations to take place. The mirror is lowered by the arm 102 until latched by the latch elements 105—108. The shutter-setting lever 63 is set. The diaphragm lever 66 is latched in its fully-open position. The shutter blade-opening lever 67 is set. The object can now be focused on the ground glass 152. The setting button 54 returns to its initial position under the action of its spring 101, so both the setting lever 99 and the setting lever 59 are out of a position in which they can impede the operation of the various parts.

The camera having been made ready for an exposure, the release button 121 may be released. This button accomplishes the various functions through the operation of the lever 119 and its associated mechanism. The first part of the downward movement of the release button 121 causes the shutter blade closing lever 67 to close the blades, releases the latch 76—77, permitting the spring 90 to move the diaphragm lever 66 against its predetermined stop, releases the latch 105—108 through downward movement of pin 115, permitting the spring 106 to raise the mirror, and, finally, during the last part of its downward movement, causes the arm 123 to depress the lug 24 on the arcuate slide plate 125 so that the arm 126 may continue to press upon the shutter trigger 65 to make an exposure. At the same time the arm 123 exerts a sufficient thrust upon arm 27 of the release lever 119 to prevent this lever from moving upwardly. The camera is now ready for a second cycle of operations and the release button 121 will only move upwardly as the shutter-setting lever 54 is moved, since by this movement setting lever 99, through arm 103, will strike arm 117 of lever 78 causing the lever edge 136 to depress the downwardly-extending lug 135 moving the lever 132 away from its blocking position with respect to the trip arm 119.

If a time exposure is to be made, the ring 137 of the shutter 64 is moved until cam 138 presses inwardly on the end 139 of a lever 140, so that pin 145, through arm 146, will rock lever 130 to a position in which the releasing arm 119 may return only partially to its initial position, this return movement being sufficient to permit a second depression of the release button 121 to complete a time exposure. By moving the ring 137 from its time-exposure position, the slide 140 moves outwardly to its Fig. 9 position in which the normal operation may occur.

I claim:

1. In a reflecting camera, the combination with a camera body, an objective, a mirror movably mounted behind the objective and movable to and from an inoperative non-reflecting position, means for manually moving the mirror to an operative reflecting position, a latch for the mirror in its inoperative position, a film-moving device, and means movable by the film-moving device for releasing the mirror latch whereby the mirror may be manually moved to an operative position only after the film-moving device has been moved.

2. In a reflecting camera, the combination with a camera body, an objective, a mirror movably mounted behind the objective and movable to and from an inoperative non-reflecting position, means for manually moving the mirror to an operative reflecting position, a latch for the mirror in its inoperative position, a film-moving device, and means movable by the film-moving device for releasing the mirror latch whereby the mirror may be manually moved to an operative position only after the film-moving device has been moved, said latch comprising an arm carried by the mirror, a hinged element carried thereby, and a bolt slidable into a position blocking movement of said arm, a spring normally holding the hinged element toward the arm, the film-moving device including means for moving the slidable bolt axially, said hinged element being adapted to move into a bolt blocking position after the bolt has been moved by the film-moving device whereby the mirror may be moved.

3. In a reflex camera, the combination with a camera body, of an objective carried thereby, a mirror hingedly mounted for movement to and from a reflecting position behind the objective, a film-winding shaft, a lug carried thereby, a pivoted lever in the path of said lug to be moved thereby, a bolt slidably mounted on said camera and movable with the pivoted lever, a latching member carried by the mirror and movable into the path of movement of the bolt to be locked thereby when said mirror is in an inoperative position raised above the objective.

4. In a reflex camera, the combination with a camera body, of an objective carried thereby, a mirror hingedly mounted for movement to and from a reflecting position behind the objective, a film-winding shaft, a lug carried thereby, a pivoted lever in the path of said lug to be moved thereby, a bolt slidably mounted on said camera and movable with the pivoted lever, a latching member carried by the mirror and movable into the path of movement of the bolt to be locked thereby when said mirror is in an inoperative position raised above the objective, the film-winding shaft being adapted to withdraw the bolt from its latching position, and means adjacent the latching member for blocking movement of the bolt towards an operative position after once being withdrawn from a latching position.

5. In a reflex camera, the combination with a camera body, of an objective carried thereby, a mirror hingedly mounted for movement to and from a reflecting position behind the objective, a film-winding shaft, a lug carried thereby, a pivoted lever in the path of said lug to be moved thereby, a bolt slidably mounted on said camera and movable with the pivoted lever, a latching member carried by the mirror and movable into the path of movement of the bolt to be locked thereby when said mirror is in an inoperative position raised above the objective, the film-winding shaft being adapted to withdraw the bolt from its latching position, and means adjacent the latching member for blocking movement of the bolt towards an operative position after once being withdrawn from a latching position, comprising a movable blocking plate spring tending to hold the blocking plate in an operative position relative to the latching member.

6. In a reflecting camera, the combination with a camera body, an objective, a mirror movably mounted behind the objective and movable to and from an inoperative non-reflecting position, means for manually moving the mirror to an operative reflecting position, an arm movable with the mirror having a ramp, a blocking plate hingedly mounted and spring pressed toward the arm movable with the mirror, a movable bolt carried by the camera and movable into the path of the arm to latch said mirror when in an inoperative position, a movable device for winding film, means operable therewith for intermittently moving said bolt from its latching position as film is wound whereby the blocking plate may move under the influence of its spring to prevent the bolt from again latching the mirror until said mirror is moved by the manually-operable means.

7. In a reflecting camera, the combination with a camera body, an objective, a mirror movably mounted behind the objective and movable to and from an inoperative non-reflecting position, means for manually moving the mirror to an operative reflecting position, an arm movable with the mirror having a ramp, a blocking plate hingedly mounted and spring pressed toward the arm movable with the mirror, a movable bolt carried by the camera and movable into the path of the arm to latch said mirror when in an inoperative position, a movable device for winding film, means operable therewith for intermittently moving said bolt from its latching position as film is wound whereby the blocking plate may move under the influence of its spring to prevent the bolt from again latching the mirror until said mirror is moved by the manually-operable means, the arm movable with the mirror and the blocking plate both being moved when the manually-operable means for moving the mirror to an operative position is moved, thereby freeing the bolt, and a spring for moving the bolt towards a latching position.

8. In a reflecting camera, the combination with a camera body, an objective, a mirror movably mounted behind the objective and movable to and from an inoperative non-reflecting position, means for manually moving the mirror to an operative reflecting position, an arm movable with the mirror having a ramp, a blocking plate hingedly mounted and spring pressed toward the arm movable with the mirror, a movable bolt carried by the camera and movable into the path of the arm to latch said mirror when in an inoperative position, a movable device for winding film, means operable therewith for intermittently moving said bolt from its latching position as film is wound whereby the blocking plate may move under the influence of its spring to prevent the bolt from again latching the mirror until said mirror is moved by the manually-operable means, the arm movable with the mirror and the blocking plate both being moved when the manually-operable means for moving the mirror to an operative position is moved, thereby freeing the bolt, means for moving the mirror to its inoperative position, said ramp on the arm moving with the mirror and being adapted to pass beneath the bolt whereby said arm may pass said bolt and may be again latched thereby as the bolt snaps over the arm.

9. In a reflecting camera, the combination with a camera body, an objective, a mirror movably mounted behind the objective and movable to and from an inoperative non-reflecting position, means for manually moving the mirror to an operative reflecting position, an arm movable with the mirror having a ramp, a blocking plate hingedly mounted and spring pressed toward the arm movable with the mirror, a movable bolt carried by the camera and movable into the path of the arm to latch said mirror when in an operative position, a movable device for winding film, means operable therewith for intermittently moving said bolt from its latching position as film is wound whereby the blocking plate may move under the influence of its spring to prevent the bolt from again latching the mirror until said mirror is moved by the manually-operable means, the arm movable with the mirror and the blocking plate both being moved when the manually-operable means for moving the mirror to an operative position is moved, thereby freeing the bolt, means for moving the mirror to its inoperative position, said ramp on the arm moving with the mirror and being adapted to pass beneath the bolt whereby said arm may pass said bolt and may be again latched thereby as the bolt snaps over the arm, the hinged blocking plate projecting above the arm movable with the mirror whereby the blocking plate is prevented from passing beneath the bolt as the mirror moves to its inoperative position.

10. A reflex camera construction as called for in claim 6 in which the hingedly-mounted blocking plate is hingedly mounted directly on the arm movable with the mirror.

11. A reflex camera construction as called for in claim 6 in which the hingedly-mounted blocking plate is hingedly mounted directly on the arm movable with the mirror and in which the spring connected to the blocking plate is also connected to the arm movable with the mirror.

12. In a reflecting camera, the combination with a camera body, an objective, a mirror movably mounted behind the objective and movable to and from an inoperative non-reflecting position, means for manually moving the mirror to an operative reflecting position, a latch for the mirror in its inoperative position, a film-moving device, and means movable by the film-moving device for releasing the mirror latch whereby the mirror may be manually moved to an operative position only after the film-moving device has been moved, an inner camera body, the camera body and inner camera body interfitting with portions of the two camera bodies spaced one from the other, the objective and mirror being mounted on the inner camera body and the film-moving device being carried by the camera body, the latch for the mirror comprising cooperating parts mounted respectively on the camera body and the inner camera body.

13. In a reflecting camera, the combination with a camera body, an objective, a mirror movably mounted behind the objective and movable to and from an inoperative non-reflecting position, means for manually moving the mirror to an operative reflecting position, a latch for the mirror in its inoperative position, a film-moving device, and means movable by the film-moving device for releasing the mirror latch whereby the mirror may be manually moved to an operative position only after the film-moving device has been moved, an inner camera body interfitting with the camera body and including a box-like structure having side and end walls, said mirror latch being carried by a side wall of the inner camera body and cooperating with the film-moving device carried by the camera body, a shutter carrying the said objective and carried on one end of the inner camera body, an exposure frame carried on the camera body, said mirror being mounted on the side walls of the inner camera body, and mechanism for operating the shutter and mirror on an outside wall of the inner camera body.

14. In a reflex camera, the combination with a camera body including a generally rectangular portion, of an inner camera body section fitting into and having a plurality of walls spaced from the generally rectangular section to form mechanism chambers between a plurality of parallel spaced walls, a mirror inside the inner camera body, mechanism for operating the mirror mounted on the inner camera body section between the parallel spaced walls, a shutter mounted on the inner camera body section, mechanism for operating the shutter mounted on the inner camera body section between parallel spaced walls and an operating member extending through the generally rectangular camera body section and from the inner camera body section for operating said mechanism, the shutter being of the type released by a trigger operative only at one end of a path of movement, the mechanism for operating the shutter including a pivoted trip lever engaging the shutter trigger, a mirror operating arm, a protuberance projecting from said arm into the path of the pivoted trip lever, a spring for moving the mirror, a latch for holding the mirror in an operating focusing position intersecting the lens axes, means for releasing the mirror latch by the trip lever during initial movement through its path, continued movement of the trip lever engaging and moving the mirror arm protuberance assisting the mirror spring to move the mirror to an inoperative position if said spring fails to move the mirror fast enough to get out of the path of movement of the trip lever, said trip lever at the end of its path of movement operating the shutter trigger to make an exposure.

15. In a reflex camera, the combination with a camera body including a generally rectangular portion, of an inner camera body section fitting into and having a plurality of walls spaced from the generally rectangular section to form mechanism chambers between a plurality of parallel spaced walls, a mirror inside the inner camera body, mechanism for operating the mirror mounted on the inner camera body section between the parallel spaced walls, a shutter mounted on the inner camera body section, mechanism for operating the shutter mounted on the inner camera body section between parallel spaced walls and an operating member extending through the generally rectangular camera body section and from the inner camera body section for operating said mechanism, the shutter being of the type released by a trigger operative only at one end of a path of movement, the mechanism for operating the shutter including a pivoted trip lever engaging the shutter trigger, a mirror operating arm, a protuberance projecting from said arm into the path of the pivoted trip lever, a spring for moving the mirror, a latch for holding the mirror in an operating focusing position intersecting the lens axes, means for releasing the mirror latch by the trip lever during initial movement through its path, continued movement of the trip lever engaging and moving the mirror arm protuberance assisting the mirror spring to move the mirror to an inoperative position if said spring fails to move the mirror fast enough to get out of the path of movement of the trip lever, said trip lever at the end of its path of movement operating the shutter trigger to make an exposure, the means for releasing the mirror latch in its operative focusing position including a pivoted spring driven release element engaging the shutter trigger and the latch for holding the mirror in its operative position, interengaging latch elements on the trip lever and release element, said latch elements being disengaged through initial movement of the trip lever.

16. In a reflex camera, the combination with a camera body including a generally rectangular portion, of an inner camera body section fitting into and having a plurality of walls spaced from the generally rectangular section to form mechanism chambers between a plurality of parallel spaced walls, a mirror inside the inner camera body, mechanism for operating the mirror mounted on the inner camera body section between the parallel spaced walls, a shutter mounted on the inner camera body section, mechanism for operating the shutter mounted on the inner camera body section between parallel spaced walls and an operating member extending through the generally rectangular camera body section and from the inner camera body section for operating said mechanism, the shutter being of the type released by a trigger operative only at one end of a path of movement, the mechanism for operating the shutter including a pivoted trip lever engaging the shutter trigger, a mirror operating arm, a protuberance projecting from said arm into the path of the pivoted trip lever, a spring for moving the mirror, a latch for holding the mirror in an operating focusing position intersecting the lens axes, means for releasing the mirror latch by the trip lever during initial movement through its path, continued movement of the trip lever engaging and moving the mirror arm protuberance assisting the mirror spring to move the mirror to an inoperative position if said spring fails to move the mirror fast enough to get out of the path of movement of the trip lever, said trip lever at the end of its path of movement operating the shutter trigger to make an exposure, the means for releasing the mirror latch in its operative focusing position including a pivoted spring driven release element engaging the shutter trigger and the latch for holding the mirror in its operative position, interengaging latch elements on the trip lever and release element, said latch elements being disengaged through initial movement of the trip lever and manually operable setting means for setting the mirror in its operative position behind the objective and moving the release element against the pressure of its spring and into a latching engagement with the trip lever.

17. In a reflex camera, the combination with a camera body including a generally rectangular portion, of an inner camera body section fitting into and having a plurality of walls spaced from the generally rectangular section to form mechanism chambers between a plurality of parallel spaced walls, a mirror inside the inner camera body, mechanism for operating the mirror mounted on the inner camera body section between the parallel spaced walls, a shutter mounted on the inner camera body section, mechanism for operating the shutter mounted on the inner camera body section between parallel spaced walls and an operating member extending through the generally rectangular camera body section and from the inner camera body section for operating said mechanism, the shutter being of the type released by a trigger operative only at one end of a path of movement, the mechanism for operating the shutter including a pivoted trip lever engaging the shutter trigger, a mirror operating arm, a protuberance projecting from said arm into the path of the pivoted trip lever, a spring for moving the mirror, a latch for holding the mirror in an operating focusing position intersecting the lens axes, means for releasing the mirror latch by the trip lever during initial movement through its path, continued movement of the trip lever engaging and moving the mirror arm protuberance assisting the mirror spring to move the mirror to an inoperative position if said spring fails to move the mirror fast enough to get out of the path of movement of the trip lever, said trip lever at the end of its path of movement operating the shutter trigger to make an exposure, the means for releasing the mirror latch in its operative focusing position including a pivoted spring driven release element engaging the shutter trigger and the latch for holding the mirror in its operative position, interengaging latch elements on the trip lever and release element, said latch elements being disengaged through initial movement of the trip lever, a "time" setting for the shutter, a cam carried by the shutter and movable to a "time" setting, a "time" lever movably mounted on the camera and movable by the cam, and means carried by the "time" lever for limiting movement of the release element after the shutter trigger has been tripped.

18. In a reflex camera, the combination with a camera body including a generally rectangular portion of inwardly formed walls at one end of the rectangular portion forming an exposure frame, film spool chambers carried adjacent the exposure frame and extending to each side of the rectangular body portion, an apertured front wall on the rectangular body portion with a shutter lying in the aperture, an inner camera body section fitting into and having the side walls spaced from the rectangular portion, said inner camera body being of materially less width than the rectangular portion, leaving mechanism chambers between the side walls of the inner and rectangular portions, a front wall on the inner camera body section, said shutter being supported thereby, a mirror carried by the inner section, and mechanism for operating the mirror and shutter lying between the spaced walls of the inner camera body section and the camera body and between the front wall of the inner section and the apertured front wall of the rectangular portion of the camera body, the inner section including rear outwardly extending flanges fastened to the inwardly formed walls of the exposure frame and the front wall of the generally rectangular portion being removable whereby the inner section may be assembled to the rectangular portion through the front wall thereof.

JOSEPH STOIBER.

REFERENCES CITED

The following references are of record in the file of this patent:

UNITED STATES PATENTS

| Number | Name | Date |
|---|---|---|
| 738,066 | Reichenbach | Sept. 1, 1903 |
| 832,969 | Hall | Oct. 9, 1906 |
| 1,279,164 | Ruttan et al. | Sept. 17, 1918 |
| 1,602,483 | Freeman | Oct. 12, 1926 |
| 1,963,107 | Walters | June 19, 1934 |
| 2,356,880 | Pignone | Aug. 29, 1944 |

FOREIGN PATENTS

| Number | Country | Date |
|---|---|---|
| 210,531 | Great Britain | Feb. 4, 1924 |